Patented Nov. 30, 1948

UNITED STATES PATENT OFFICE 2,455,261

ETHERS OF 5-HYDROXY, 3-METHYL, PENTA-3-EN-YNE-1

Nicholas A. Milas, Belmont, Mass., assignor to Research Corporation, New York, N. Y., a corporation of New York No Drawing. Application September 5, 1946, Serial No. 695,057

4 Claims. (Cl. 260—611)

This application is a continuation-in-part of my pending application Serial No. 573,313, filed January 17, 1945 (now Patent No. 2,412,465) which in turn is a continuation-in-part of my application Serial No. 409,314 filed September 2, 1941 (now Patent No. 2,369,157) and is filed for the purpose of patenting subject matter which is disclosed but not claimed in said pending application and patent.

The present application relates to the compounds of the formula $$\begin{array}{c}R\\ \diagdown\\ R-C-O-CH_2-CH=C-C\equiv CX\\ \diagup\\ R\end{array}\quad \begin{array}{c}CH_3\\ |\\ \end{array}$$

in which R stands for hydrogen or a hydrocarbon group and X stands for hydrogen or a Grignard group (MgHaL) or a metal of the first periodic group. In the above formula the group

may be any alkyl group such as methyl, ethyl, etc., including substituted alkyls such as triphenyl methyl in which the R's are phenyl groups.

The compounds are prepared as follows:

A compound of the formula

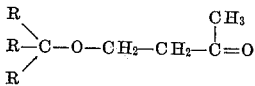

is converted into the corresponding acetylene carbinol which is dehydrated and the dehydration product converted into the corresponding Grignard or metallo derivative (metal of the first group of the periodic system).

The following reaction scheme illustrates the process:

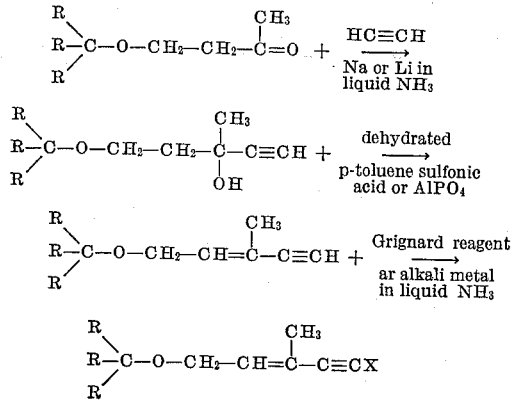

In the above formulae R and X have the meanings defined above.

The following are detailed descriptions of the procedure followed in the steps of the process represented by the foregoing reaction scheme.

Preparation of 3-methyl 5-ethoxy penta-1-yn-3-ol having the formula

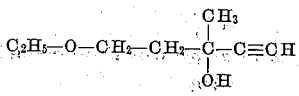

from β-ethoxyethyl methyl ketone having the formula

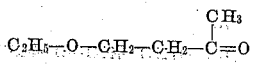

One liter of liquid ammonia was saturated with dry acetylene and, while stirring and passing acetylene through the liquid, 3.9 g. of lithium (sodium has also been used with less satisfactory results) was added in the course of one-half hour keeping the temperature of the mixture below —40° C. When all of the lithium had been converted to lithium acetylide, the mixture was cooled to —70° and to it added slowly with stirring in the course of one hour 58 g. of β-ethoxy-ethyl methyl ketone. Stirring was continued at the above temperature for 7-8 hours longer while a gentle stream of acetylene was allowed to pass through the mixture. The ammonia was then allowed to evaporate and 250 cc. of ether added to the residue and the mixture cooled to 0° and hydrolyzed with a solution of ammonium sulfate or chloride. The non-aqueous layer was then removed and the aqueous layer extracted twice with 250 cc. of ether and the ether extracts combined, dried and fractionated under reduced pressure using a six-inch Vigreux volumn. The fraction (28 g.) boiling at 50°-51° (4 mm.) was collected and analyzed.

$n_D^{25}$, 1.4370; $d_4^{26}$, 0.922

Anal. Calcd. for $C_8H_{14}O_2$: C, 67.60; H, 9.86; unsaturation, 2 F; active hydrogen (Zerewitinoff), 2. Found: C, 67.59, 67.83; H, 9.44, 9.55; unsaturation, 2.1 F (Pd) active hydrogen (Zer.), 1.9, 2.06.

This acetylene carbinol gives a heavy precipitate with ammoniacal alcoholic silver nitrate solution. Other methods of preparing this acetylene carbinol are disclosed in my Patent No. 2,369,157.

Dehydration of the 3-methyl 5-ethoxy penta-1-yn-3-ol to 3-methyl 5-ethoxy penta-3-en-yne-1 having the formula

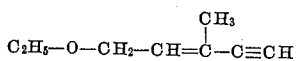

Twenty-six grams of 3-methyl 5-ethoxy penta- 1-yn-3-ol was passed upwards under a reduced nitrogen pressure (35 mm.) through a tube containing a mixture of aluminum phosphate and pumice and maintained at temperatures between 290–300° C. The crude dehydrated mixture was dried and fractionated under reduced pressure and the fraction boiling at 53°–54° (18 mm.) collected and analyzed. It was found to have an active hydrogen (Zer.) of 1.01, 0.92 and an unsaturation of 3.1, 3.09 ⊦ agreeing very well with the theoretical values of 1.0 and 3.0 respectively; $n_D^{25}$, 1.4470.

3-methyl 5-ethoxy penta-1-yn-3-ol can also be dehydrated with anhydrous p-toluene sulfonic acid (usually about one-tenth by weight of the amount of the acetylene carbinol used) in solution with benzene, toluene or xylene. A portion of the solvent is distilled under a slightly reduced nitrogen pressure carrying with it the water formed by the dehydration of the carbinol. Finally, the mixture is extracted with dilute alkali to remove the p-toluene sulfonic acid, dried and fractionated to recover the product.

*Conversion of the 3-methyl 5-ethoxy penta-3-en-yne-1 into its Grignard derivative.*—A Grignard reagent was prepared in the usual manner from 6.3 g. of ethyl bromide and 1.4 g. of magnesium. The mixture was then cooled to 0° in an atmosphere of nitrogen and to it was added dropwise with stirring 6.5 g. of 3-methyl 5-ethoxy penta-3-en-yne-1, and stirring was continued overnight at room temperature. A white precipitate which was formed in the cold goes slowly into solution at room temperature. Finally, to insure complete reaction, the mixture was refluxed for one hour before proceeding with the next step.

The β-ethoxyethyl methyl ketone used as starting material in the above series of reactions and the corresponding trityl ether having the formula

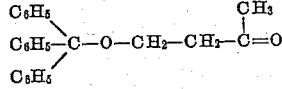

may be obtained as described in my Patent No. 2,369,157.

*Conversion of β-triphenyl methoxy ethyl methyl ketone to β-triphenyl methoxy ethyl methyl ethynyl carbinol.* To 200 cc. of anhydrous t-butyl alcohol (distilled over a small amount of sodium) in a one liter, 3-necked flask equipped with a Hershberg stirrer, a dropping funnel and a bent side tube, add ten grams of metallic potassium. After all of the potassium had dissolved, pass through the solution while stirring dry acetylene for one-half hour. Add slowly, in the course of one hour, while acetylene is being passed through the solution, 80 g. of β-triphenyl methoxy ethyl methyl ketone dissolved in about 200 cc. of anhydrous ether. Continue stirring and passing acetylene for six hours longer. Pour product onto a mixture of ice and tartaric acid and extract with ether. Dry the ether solution with anhydrous magnesium sulfate and purify the product by recrystallization.

The β-triphenyl methoxy ethyl methyl ethynyl carbinol is then converted to the Grignard thereof as follows:

Prepare a Grignard solution in a large 3-necked dropping funnel using freshly purified ethyl bromide (31 g.) and magnesium turnings (6.75 g.) in 200 cc. of anhydrous ether and after all of the magnesium has gone into solution allow the Grignard solution to drop into an ethereal (anhydrous) solution of 50 g. of β-triphenyl methoxy ethyl methyl ethynyl carbinol. Reflux the mixture for 2 to 3 hours. The solution is now ready for the next step.

I claim:

1. As a new product a compound of the formula

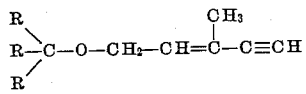

in which

represents a member of the group consisting of the lower alkyl groups and the triphenyl methyl group.

2. A new product as defined in claim 1 in which the group

is a methyl group.

3. A new product as defined in claim 1 in which the group

is an ethyl group.

4. A new product as defined in claim 1 in which the group

is a triphenyl methyl group.

NICHOLAS A. MILAS.

REFERENCES CITED

The following references are of record in the file of this patent:

FOREIGN PATENTS

| Number | Country | Date |
|--------|---------|------|
| 601,822 | Germany | Aug. 25, 1934 |